(12) United States Patent
Posamentier

(10) Patent No.: US 6,895,147 B2
(45) Date of Patent: May 17, 2005

(54) LASER POWER MONITORING TAP

(75) Inventor: Joshua D. Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/608,879

(22) Filed: Jun. 26, 2003

(65) Prior Publication Data

US 2004/0264881 A1 Dec. 30, 2004

(51) Int. Cl.⁷ .............................................. G02B 6/26
(52) U.S. Cl. ........................... 385/47; 385/88; 385/48; 385/49
(58) Field of Search ................... 385/88, 89, 47, 385/48, 49, 12; 372/23, 48, 108

(56) References Cited

U.S. PATENT DOCUMENTS

| | | | | |
|---|---|---|---|---|
| 4,176,908 A | * | 12/1979 | Wagner | 385/47 |
| 6,124,956 A | * | 9/2000 | Severn | 398/28 |
| 2003/0231664 A1 | * | 12/2003 | Geske | 372/23 |
| 2004/0179784 A1 | * | 9/2004 | Vancoille et al. | 385/47 |

* cited by examiner

Primary Examiner—Fayez G. Assaf
(74) Attorney, Agent, or Firm—Kevin A. Reif

(57) ABSTRACT

A prismatic tap assembly positioned over a vertical cavity surface emitting laser (VCSEL) redirects a small portion of a beam back to a light detector positioned adjacent to the VCSEL. The larger portion of the beam passes through the tap assembly and into, for example, an optical fiber. The light received by the light detector may be used to monitor the power output of the VCSEL and may be used for control purposes.

21 Claims, 2 Drawing Sheets ical communication systems. The more traditional type edge emitting laser diodes emit coherent light parallel to the semiconductor junction layer. In contrast, VCSELs emit a coherent beam perpendicular to the boundaries between the semiconductor junction layers. In other words, VCSELs emit a beam in a vertical direction from the substrate as opposed to emitting a beam in the same plane as the substrate. Among other advantages, this may make it easier to couple the light beam to an optical fiber and may be more efficient.

LASER POWER MONITORING TAP

BACKGROUND INFORMATION

Lasers are used in a wide variety of applications. In particular, lasers are integral components in optical communication systems where a beam modulated with vast amounts of information may be communicated great distances at the speed of light over optical fibers.

Of particular interest is the so-called vertical cavity surface emitting laser (VCSEL). As the name implies, this type of laser is a semiconductor micro-laser diode that emits light in a coherent beam orthogonal to the surface of a fabricated wafer. VCSELs are compact, relatively inexpensive to fabricate in mass quantities, and may offer advantages over edge emitting laser which currently comprise the majority of the lasers used in today's optical communication systems. The more traditional type edge emitting laser diodes emit coherent light parallel to the semiconductor junction layer. In contrast, VCSELs emit a coherent beam perpendicular to the boundaries between the semiconductor junction layers. In other words, VCSELs emit a beam in a vertical direction from the substrate as opposed to emitting a beam in the same plane as the substrate. Among other advantages, this may make it easier to couple the light beam to an optical fiber and may be more efficient.

VCSELs may be efficiently fabricated on wafers using standard microelectronic fabrication processes and, as a result, may be integrated on-board with other components. VCSELs may be manufactured using, for example, aluminum gallium arsenide (AlGaAs), gallium arsenide (GaAs), indium gallium arsenide nitride (InGaAsN), or similarly suited materials. VCSELS have been successfully manufactured in 850 nm, 1310 nm and 1550 nm ranges. This allows for a wide variety of fiber optic applications ranging from short reach applications to long haul data communications. VCSELs are promising to advance optical communication systems by providing a fast, inexpensive, energy efficient, and more reliable source of laser beam generation.

As with many semiconductor lasers, most VCSEL modules include a photodiode to monitor the output of the laser. This information is typically used in a feedback loop along with a controller to monitor the performance of the laser in real time and to make adjustments to operational parameters to compensate for ambient conditions as well as other anomalies such as aging that may affect laser output.

DETAILED DESCRIPTION

Vertical cavity surface emitting lasers (VCSELs) typically emit a beam from one relatively large symmetric aperture or "facet". Thus the beam tends to be conical and has a relatively wide divergence. Due to their structure, VCSELs have only one light emitting facet as compared to other laser diodes such as edge emitting diodes which emit a beam from both a front and a back facet. This is a drawback to VCSELs since a second beam emerging from the back facet can be useful as it provides a convenient and readily available means for monitoring output power of the laser that may be used for control purposes.

Figure 1:
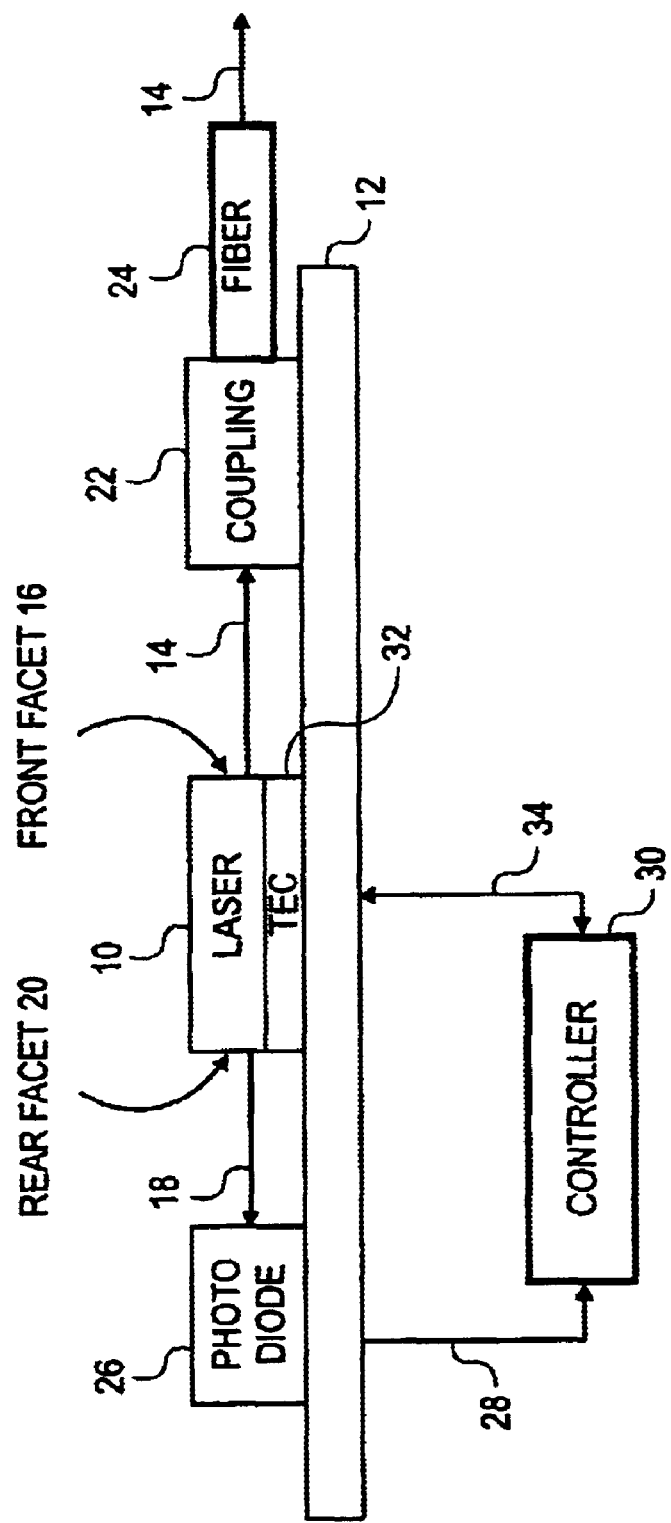
FIG. 1 is a block diagram of a simple control scheme for monitoring laser power.

FIG. 1 is a block diagram of a simple monitoring scheme for a typical edge emitting distributed feedback laser (DFL). An edge emitting laser diode 10 is mounted to a substrate 12. As discussed above, the laser 10 emits two beams. A main beam 14 is emitted from the front facet 16, and a second beam, referred to as the monitored beam 18, is emitted from the rear facet 20. For communication applications, the laser 10 may be modulated by any of a number of modulation methods. The main beam 14 may further encounter one or more coupling optics including but not limited to collimators, lenses, or isolators, shown here simply as a coupling block 22, prior to being launched into a fiber 24.

Conveniently, the monitoring beam 18, emerging from the rear facet 20, comprises characteristics of the main beam 14 and therefore may provide a readily available source for monitoring various parameters of the main beam 14 such as power, wavelength, etc. For monitoring power, a detector photo diode 26 may be placed directly in the path of the monitoring beam 18. The photo diode may output an electrical signal 28 corresponding to the power being output by the laser 10 that may be used by a controller 30 to adjust various operational parameters of the laser 10. For example, the controller 30 may output a signal 34 to adjust the operational current to the laser 10 or may adjust the temperature of the laser such as with a thermo-electric cooling (TEC) device 32. A temperature sensor (not shown) associated with the TEC 32 may also be included to provide temperature feedback for the controller 30.

Just as in the case of the more traditional edge emitting diodes describe above, it is also typically desirable to monitor the output of a VCSEL. Unfortunately, as noted above, the VCSEL, does not include a light emitting rear facet and thus does not produce a separate monitoring beam. VCSELs produce only one beam that travels in a direction orthogonal (i.e. vertical) to the substrate, making it difficult to directly observe for monitoring purposes.

Figure 2:
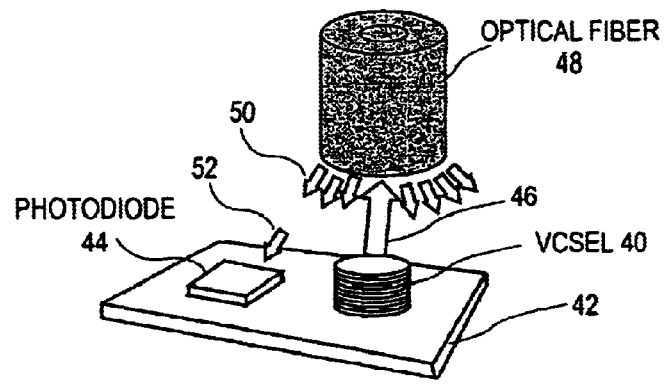
FIG. 2 is an optical module including an assembly for monitoring the power output of a VCSEL via back scattered light.

FIG. 2 shows a method for monitoring the output of a VCSEL. As shown, a VCSEL 40 is positioned on a substrate 42. Also positioned on the substrate 42 is a photodiode 44, adjacent to the VCSEL 40. A light beam 46 emerges from the VCSEL 40 and into an optical fiber 48, such as a multi-mode optical fiber. A lens (not shown) may be positioned between the VCSEL 40 and the fiber 48. A portion of the light 50 from the beam 46 is reflected and scattered due to imperfect coupling. Some of this scattered light 52 illuminates the photodiode 44. This method does provide some useful information that allows beam output power to be at least estimated with some certainty. However, under many conditions the light 52 reaching the photodiode 44 may not be a true representation of the total power of light 46 leaving the VCSEL 40 because the VCSEL has a spatial mode structure which is not stable with time, temperature, or bias current. VCSELs typically exhibit a complex transverse multimode pattern, which determines the far-field profiles and consequently the coupling properties into waveguides. Hence, the light output from a VCSEL 40 (i.e., the pattern) may not be uniform and may change both spatially and in the wavelength domain making monitoring less accurate than may be desired. Thus, better ways of collecting light would improve the power monitoring control loop and hence improve the overall stability of average optical power as a function of time, temperature, and laser bias.

Figure 3:
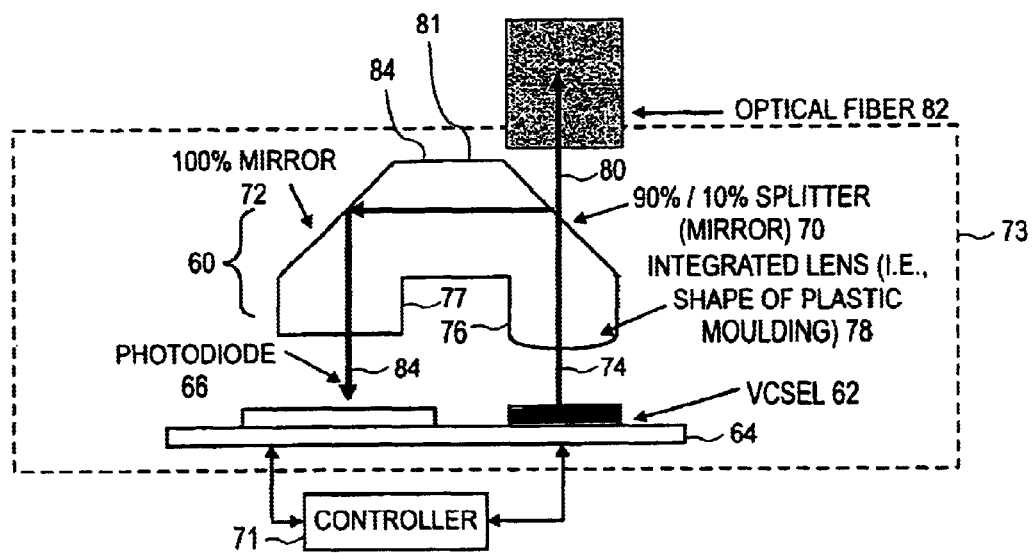
FIG. 3 is an optical module for monitoring the power output of a VCSEL via a monitoring tap according to an example embodiment of the invention.

Referring now to FIG. 3, there is shown a VCSEL module including tap assembly 60 according to an example embodiment of the invention. As before, a VCSEL 62 is positioned on a substrate 64. A photodiode 66 is also positioned on the substrate 64 adjacent to the VCSEL 62. The tap assembly 60 is a prism like structure and includes two opposing mirrored surfaces placed at, for example, a 45 degree angles to the vertical although the invention is not limited thereto. The first mirrored side 70 may comprises a partially reflective (e.g., semi-silvered) mirror which acts as a splitter, reflecting a small portion of an impinging beam to the second mirrored surface 72 and allowing a larger portion of the impinging beam to pass. As shown, the partially reflective mirrored surface 70 acts as a 90/10% splitter allowing 90% of the beam 74 to pass and reflecting or "tapping" the remaining 10% of the beam 84. This is for illustrative purposes only as different ratios may also be employed without departing from the scope. The second mirrored surface 72 is preferably totally reflective and serves to direct the portion of light that is tapped directly to the monitoring photodiode 66. As before, a feedback loop including a controller 71 may also be employed for controlling parameter of the VCSEL 62 based on the output of the monitoring photodiode 66.

This prismatic tap monitoring assembly is particularly applicable to the multimode optical front end transponder subassemblies as these may already be made from precision injection molded plastic and can be coated to form mirrors for the sides 70 and 72. The entire assembly may be packaged in any one of a variety of standard hermetic housing packages 73 such as a can-package or a butterfly style optical assembly although not limited thereto.

In operation, a beam 74 is emitted from the VCSEL 62 in a vertical direction toward an input leg 76 of the tap assembly 60. The tap assembly including the input leg 76, output leg 77, and a horizontal connecting portion 81 may be made of injected molded plastic and may include integrated optics such as a lens 78. When the beam encounters the first partially reflective mirrored side 70 it is split with the majority of the beam 80 passing directly through the side 70 and into an optical fiber 82. The reflected or "tapped" portion of the beam 84 is thereafter directed to the second mirrored side 72 which reflects the tapped portion 84 through an output leg 77 directly to the monitoring photodiode 66.

Accordingly, embodiments of the invention may provide a more reliable method of measuring fiber-coupled optical power output from a laser allowing power monitoring measurements to more faithfully represent the actual light output from the laser. Thus, the laser can be more accurately controlled.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An optical device, comprising:
   an input leg;
   an output leg, parallel to said input leg and separated by a horizontal connecting portion, the horizontal connecting portion having a first angled surface above the input leg and a second angled surface above the output leg;
   a first coating to form a partially reflective mirror on the first angled surface over the input leg to allow a portion of a beam to pass straight through the input leg from a source; and
   a second coating to form a substantially totally reflective mirror on the second angled surface above the output leg.

2. The optical device as recited in claim 1 further comprising:
   a lens integrated at a tip of said input leg.

3. The optical device as recited in claim 1 wherein,
   said partially reflective mirror is positioned to reflect a remaining portion of the beam from said input leg to said totally reflective mirror, and
   said totally reflective mirror is positioned to reflect light through said output leg.

4. The optical device as recited in claim 3 further comprising:
   a light source to emit the beam in a vertical direction relative to a substrate into said input leg; and
   a detector positioned on said substrate adjacent said laser to receive the remaining portion of said beam from said output leg.

5. The optical device as recited in claim 4 wherein said horizontal distance is a distance spanning said light source and said detector positioned on said substrate.

6. The optical device as recited in claim 5 wherein said light source comprises a vertical cavity surface emitting laser (VCSEL).

7. The optical device as recited in claim 6 wherein further comprising:
   a hermetic housing to package said optical device.

8. The optical device as recited in claim 5 wherein said partially reflective mirror comprises a splitter.

9. The optical device as recited in claim 8, further comprising:
   an optical fiber above said partially reflective mirror.

10. The optical device as recited in claim 1 wherein said input leg, said output leg, and said horizontal connecting portion comprise molded plastic.

11. A method for monitoring a beam traveling orthogonal to a substrate, comprising:
    positioning an input leg of a tap device over a light source on a substrate;
    positioning an output leg of said tap device over a light detector on said substrate;
    reflecting a capped portion of light from said light source traveling through said input leg off a coated surface to said output leg and onto said light detector; and
    passing a larger portion of light directly through the input leg to a fiber.

12. A method of monitoring a beam as recited in claim 11, further comprising:
    forming said input leg and said output leg from an integral piece of molded plastic.

13. A method of monitoring a beam as recited in claim 12 further comprising:
    forming a lens on an end of said input leg.

14. A method of monitoring a beam as recited in claim 11 wherein said capped portion of light comprises approximately 10% of the light.

15. A method of monitoring a beam as recited in claim 11, further comprising:

using signals from said light detector to control operating parameters of said light source.

16. An optical system, comprising:

a vertical cavity surface emitting laser (VCSEL) positioned on a substrate;

a light detector positioned adjacent said VCSEL on said substrate;

a monitoring assembly above said substrate, comprising:
an input leg over said VCSEL;
an output leg over said light detector, parallel to said input leg and separated by a horizontal connecting portion, the horizontal connecting portion having a first angled surface above the input leg and a second angled surface above the output leg;
a first coating to form a partially reflective mirror on the first angled surface over the input leg to allow a portion of a beam to emerge from a top of the input leg; and
a second coating to form a substantially totally reflective mirror on the second angled surface above the output leg.

17. An optical system as recited in claim 16, further comprising:

a lens formed in an end of said input leg.

18. An optical system as recited in claim 16 wherein said monitoring assembly comprises molded plastic.

19. An optical system as recited in claim 18 further comprising:

a hermetic housing for packaging said substrate and said monitoring assembly.

20. An optical system as recited in claim 19 further comprising a fiber positioned over said partially reflective mirror.

21. An optical system as recited in claim 16 further comprising:

a controller for receiving signals from the light detector to control operating parameters of said VCSEL.

* * * * *

UNITED STATES PATENT AND TRADEMARK OFFICE
CERTIFICATE OF CORRECTION

PATENT NO. : 6,895,147 B2
DATED : May 17, 2005
INVENTOR(S) : Posamentier

It is certified that error appears in the above-identified patent and that said Letters Patent is hereby corrected as shown below:

Column 4,
Lines 52 and 66, delete "capped" and insert -- tapped --.

Signed and Sealed this

Twelfth Day of July, 2005

JON W. DUDAS
*Director of the United States Patent and Trademark Office*